(12) United States Patent
Günnewig et al.

(10) Patent No.: US 6,723,355 B2
(45) Date of Patent: Apr. 20, 2004

(54) METHOD FOR EXTRACTING FRUIT AND VEGETABLE JUICES

(75) Inventors: Wolfgang Günnewig, Beckum (DE); Stefan Pecoroni, Oelde (DE)

(73) Assignee: Westfalia Separator AG, Oelde (DE)

( * ) Notice: Subject to any disclaimer, the term of this patent is extended or adjusted under 35 U.S.C. 154(b) by 0 days.

(21) Appl. No.: 10/220,607

(22) PCT Filed: Mar. 27, 2001

(86) PCT No.: PCT/EP01/03424

§ 371 (c)(1),
(2), (4) Date: Sep. 3, 2002

(87) PCT Pub. No.: WO01/84965

PCT Pub. Date: Nov. 15, 2001

(65) Prior Publication Data

US 2003/0021867 A1 Jan. 30, 2003

(30) Foreign Application Priority Data

May 10, 2000 (DE) .......................................... 100 22 892

(51) Int. Cl.⁷ .................................................. A23L 2/04
(52) U.S. Cl. ........................ 426/51; 426/599; 426/489
(58) Field of Search .............................. 426/51, 52, 599, 426/482, 489

(56) References Cited

U.S. PATENT DOCUMENTS

| | | | | |
|---|---|---|---|---|
| 4,716,044 A | * | 12/1987 | Thomas et al. | 426/51 |
| 5,096,719 A | * | 3/1992 | Gresch | 426/51 |
| 5,110,472 A | * | 5/1992 | Gresch | 210/632 |
| 5,918,819 A | * | 7/1999 | Rabinovich et al. | 241/5 |

FOREIGN PATENT DOCUMENTS

| | | | |
|---|---|---|---|
| EP | 0 545 944 | * | 6/1993 |
| EP | 0 888 718 | * | 1/1999 |
| NL | 24022 | * | 3/1931 |

OTHER PUBLICATIONS

Nelson et al. Fruit and Vegetable Processing Technology. "Citrus Purees", pp. 489–494. Third Edition, 1980.*

* cited by examiner

Primary Examiner—Keith Hendricks
(74) Attorney, Agent, or Firm—Barnes & Thornburg

(57) ABSTRACT

A method for extracting fruit or vegetable juices, the steps comprising: grinding one of fruits and vegetables to obtain a mash; adding peel components to the mash; and juicing the mash.

16 Claims, 5 Drawing Sheets

Method With Peel Return
(Method According To The Invention)
- Example -

Cloudy Juice Production With Peel Return
(Method According to the Invention)
- Example -

METHOD FOR EXTRACTING FRUIT AND VEGETABLE JUICES

This application is a 371 national stage entry of PCT/EP01/03424, filed Mar. 27, 2001.

BACKGROUND AND SUMMARY OF INVENTION

The invention relates to a method of extracting fruit and vegetable juices, the fruit being reduced in order to produce mash, and the mash obtained from the reduced fruit being juiced.

A method of the above-mentioned type in which a naturally cloudy fruit or vegetable juice is to be obtained is known from European Patent Document EP 0 545 944 B1. According to this document, a mash obtained from reduced fruit is separated into flesh parts and juice in a solid-jacket screw-type centrifuge. The separation of insoluble fruit flesh parts by means of the solid-jacket screw-type centrifuge takes place immediately after the reduction of the fruit, and immediately thereafter, an inactivation takes place of pectolytic enzymes and polyphenol oxidases of the fruit by heating the juice draining out of the solid-jacket screw-type centrifuge.

As explicitly described in European Patent Document EP 0 545 944 B1, a mash is first obtained from the fruit by means of a grinding process. In a next process step, the mash is juiced (see FIG. 1). In this case, the physical structure of the mash plays an important role.

In addition to being extracted by means of solid-jacket screw-type centrifuges, juices can also be obtained by means of presses. The usable presses include discontinuously operating presses as well as belt and screw-type presses. For obtaining juice, screw-type presses are, however, used only to a limited extent. They are used more frequently in the field of the production of wine and fruit wine.

When obtaining juice, it is also possible to use full-liquefaction enzymes. In this case, the structure of the mash is impaired because, for reasons of taste, solids, such as stalks, cores and peels, are separated from the mash. This usually takes place by means of so-called finishers (for example, sieving machines; see FIG. 2). The structural impairment of the mash can at least largely be compensated by adding pressing aids (see FIG. 3). According to the state of the art, inorganic or organic substances are essentially used as pressing aids, which improve the physical structure of the mash. Rice husks, balm wood or perlites are used most frequently. However, these substances cause additional cost and therefore make the juice production more expensive. In addition, despite their partly natural origin, they represent a foreign substance, which is undesirable per se, in the respective natural fruit juice product.

Based on the above, it is an object of the invention to increase the quality of the mash when extracting fruit juice.

In contrast to the state of the art, according to the teaching of the present invention, peel components are added to another or a same mash before the juicing particularly after an optional separation of stalks and/or cores. This teaching is based on the idea of increasing the quality of the mash to be juiced by adding peel components. Peel components have no negative taste characteristics, but improve the structure of the mash. This applies essentially to any type of juicing.

According to a particularly preferred embodiment of the invention, the stalk, core and peel components are separated in a finisher from the mash obtained from the reduced fruit; then the peel components are separated from the remaining solids components and, before their juicing, are returned into the mash. This embodiment of the invention is also very suitable for a juice extraction in which enzymes or full liquefaction enzymes are used. In particular, the invention utilizes the recognition that, although for reasons of taste a separation of the stalks and cores from the mash is required, a separation of the peel components has no effect on the taste. The reason is that particularly the separation of the peel components results in a structural impairment of the mesh. This is prevented by returning the peel components. In contrast to the state of the art, it is even possible to eliminate the adding of other aids, which are not part of the fruit and cause additional costs.

The use of the invention for juicing by means of a solid-jacket screw-type centrifuge is particularly advantageous.

It is also particularly advantageous when peel components from the same mash or from another fruit mash occurring during another juicing are added to the mash to be juiced. Here also, it is particularly advantageous for the juicing to take place by means of a solid-jacket screw-type centrifuge.

It is also conceivable to intermediately store a portion of or all separated peel components and then add them to other fruit mashes. Thus, for example, when obtaining apple or pear juice, the peel components can be separated and then not be returned into the mash but, for obtaining a fruit juice from another type of fruit, be admixed to the mash made of this other type of fruit for improving the mash structure.

It is also conceivable to increase the fraction of peel components beyond the natural content of the original fruit and thereby improve the characteristics of the mash—for example, for obtaining a particularly high-quality and expensive juice.

It is also conceivable to optimize the effect of the peel components by a grinding—for example, finer or coarser—adapted to the characteristics of the original fruit.

It is also conceivable to subject the peel components to a thermal treatment before they are added to a mash. As a result, the structure of the peel components is strengthened and a durability is achieved simultaneously.

The separation of the peel components from the other solids can be carried out in a manner which is simple per se. Such a separation is known, for example, from the extraction of grape rape for producing grape seed oil. It therefore represents no technical difficulties to a person skilled in the art. However, a novelty of the present process is that, after the separation of the core and stalk components, the peel components are returned into the mash in order to improve its structure. The returning of the peels results in a clear improvement of the mash structure and therefore in an improved extraction of juice from the mash. Thus, full liquefaction as referred to above and in FIG. 3, can be utilized in the present invention without having to accept the disadvantage of impaired mash characteristics—particularly the disadvantage of the poor juiceability of the mash.

Other aspects, advantages and novel features of the present invention will become apparent from the following detail description of the invention when considered in conjunction with the accompanying drawings.

DETAILED DESCRIPTION OF THE PREFERRED EMBODIMENTS

Figure 1:
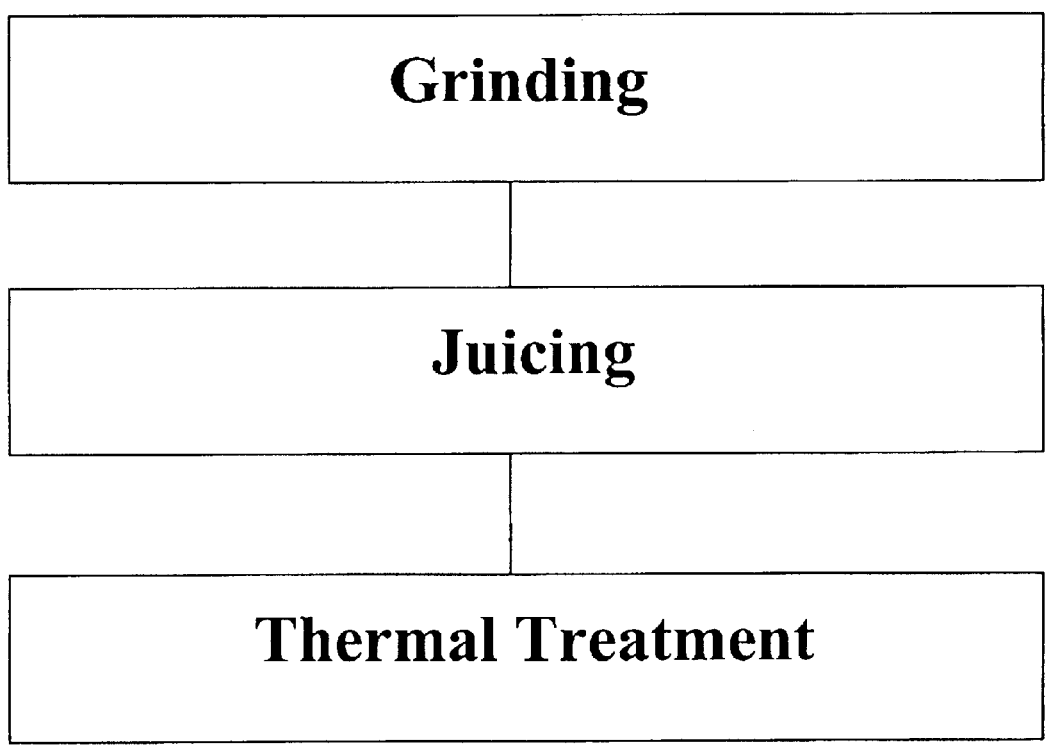
FIG. 1 is a flow chart for illustrating a standard process for extracting juice, according to the state of the art.
Figure 2:
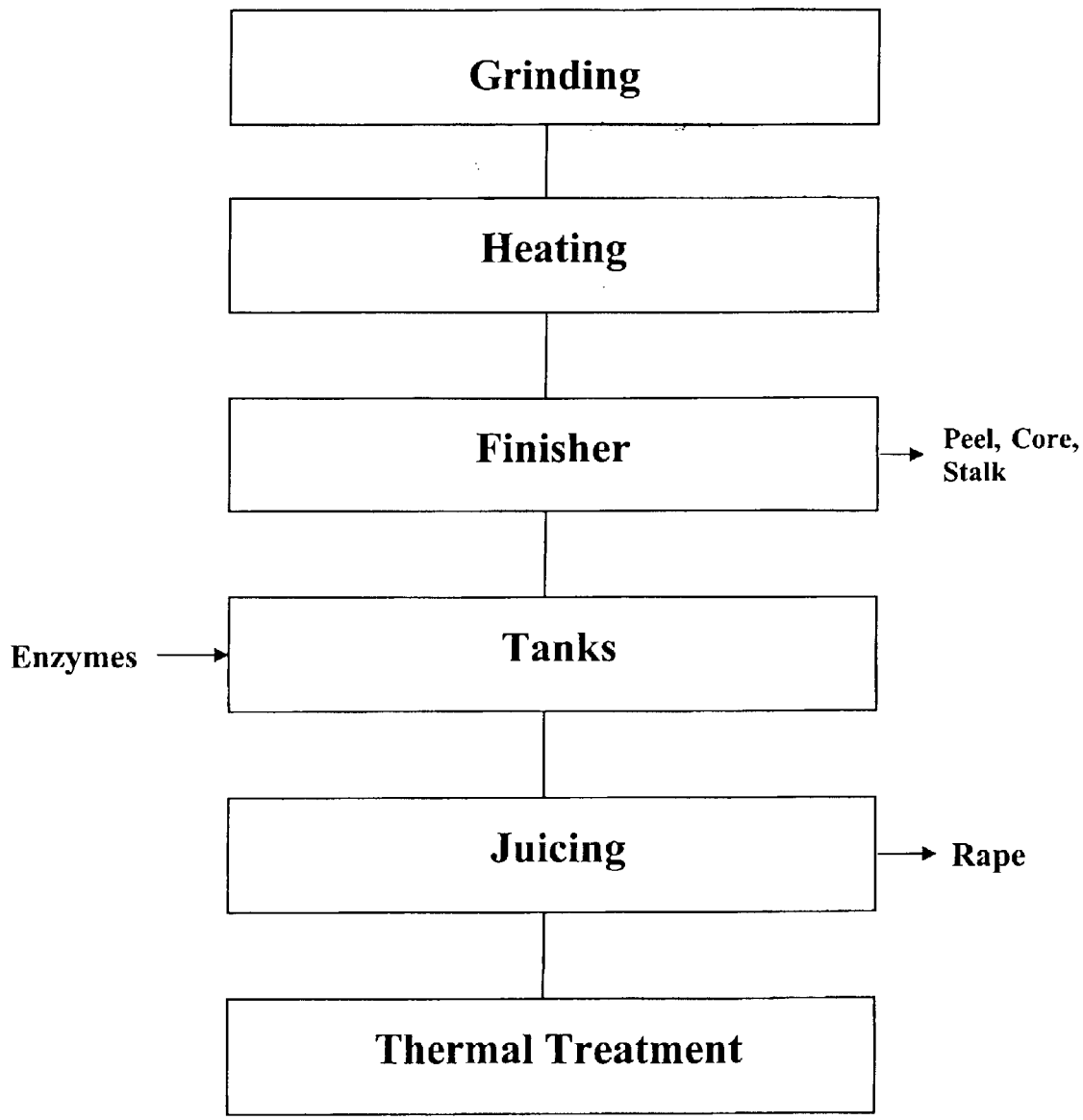
FIG. 2 is a flow chart of the extraction of juice, for example, by means of a full liquefaction without additional aids, according to the state of the art.
Figure 3:
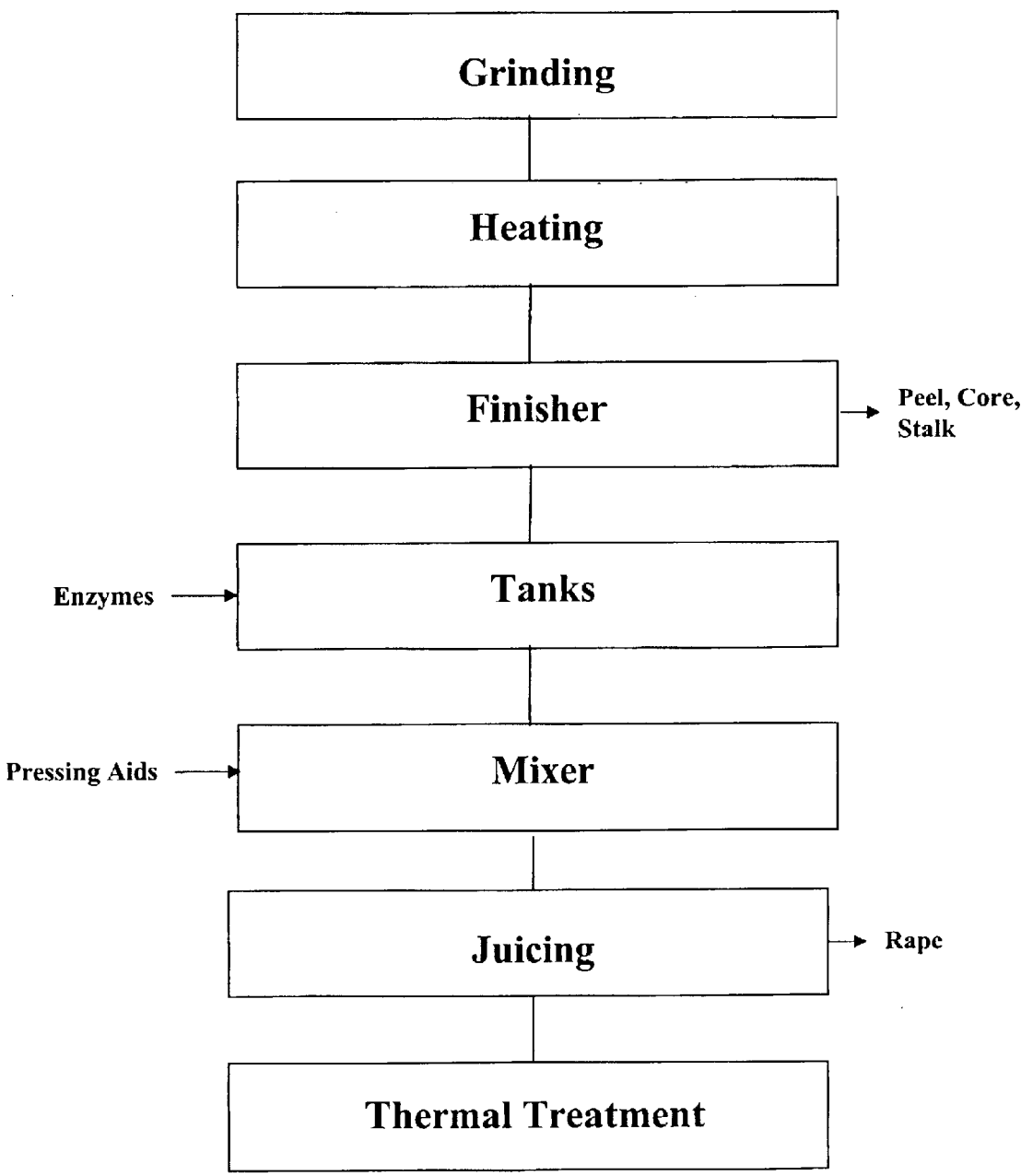
FIG. 3 is a flow chart of a full liquefaction, while adding pressing aids after the separation of the peel, stalk and core components, according to the state of the art.
Figure 4:
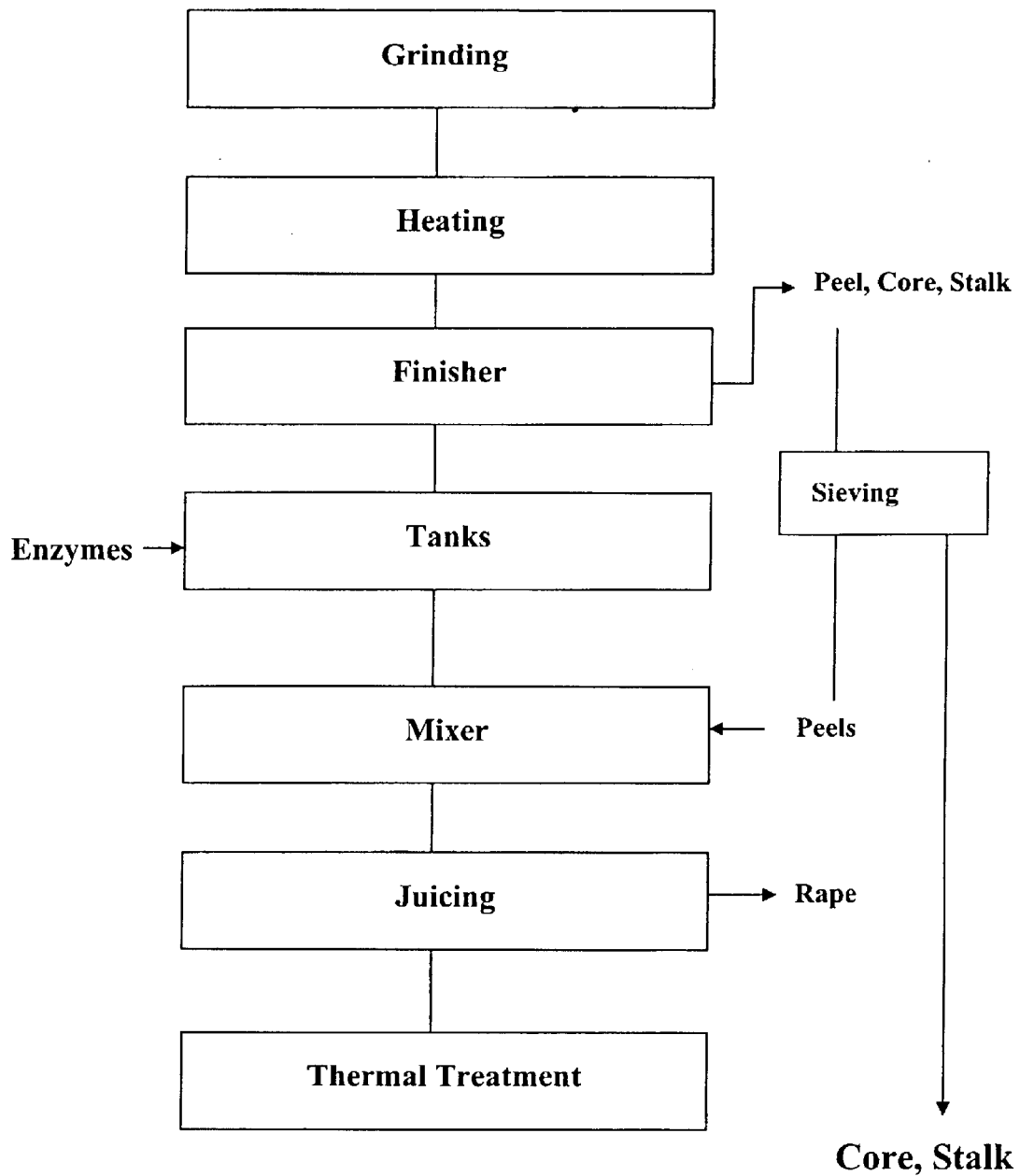
FIG. 4 is a flow chart of a method of extracting juice with a return of peels, according to the present invention.

In an embodiment shown in FIG. 4, the fruit or vegetable starting material not shown is ground or reduced 10 in a first operating step to obtain a mash 12 having peels 16, cores 18 and stalks 20. This is followed by an heating 14 of the mash 12 obtained during the grinding 10. A separation of the peels 16, cores 18 and stalks 20 may occur in a finisher 22. The mash 12 is intermediately stored in tanks 26, in which case enzymes 28, for example, for full liquefaction, can optionally be added to the mash 12. Parallel thereto, the peel components 16 may be separated from the stalk 20 and core 18 components or solids, for example, by a sieve 30 or a centrifuge (not shown). The non-peel, or stalk 20 and core 18 components, can now be disposed of and/or separately processed. In contrast, the peel components 16, together with the mash 12 removed from the tanks 26, are fed into a mixer 34 in order to improve the structure of the mash 12 by returning the peel components 16 to the mash 12. The peel components 16 may be subjected to thermal treatment before being added to the mash 12. Subsequently, a juicing 36 takes place yielding a juice 40 while also separating a rape 38. For improving its storage capacity or longevity, the obtained juice 40 can then also be subjected to a thermal treatment 42 following the juicing 36.

Figure 5:
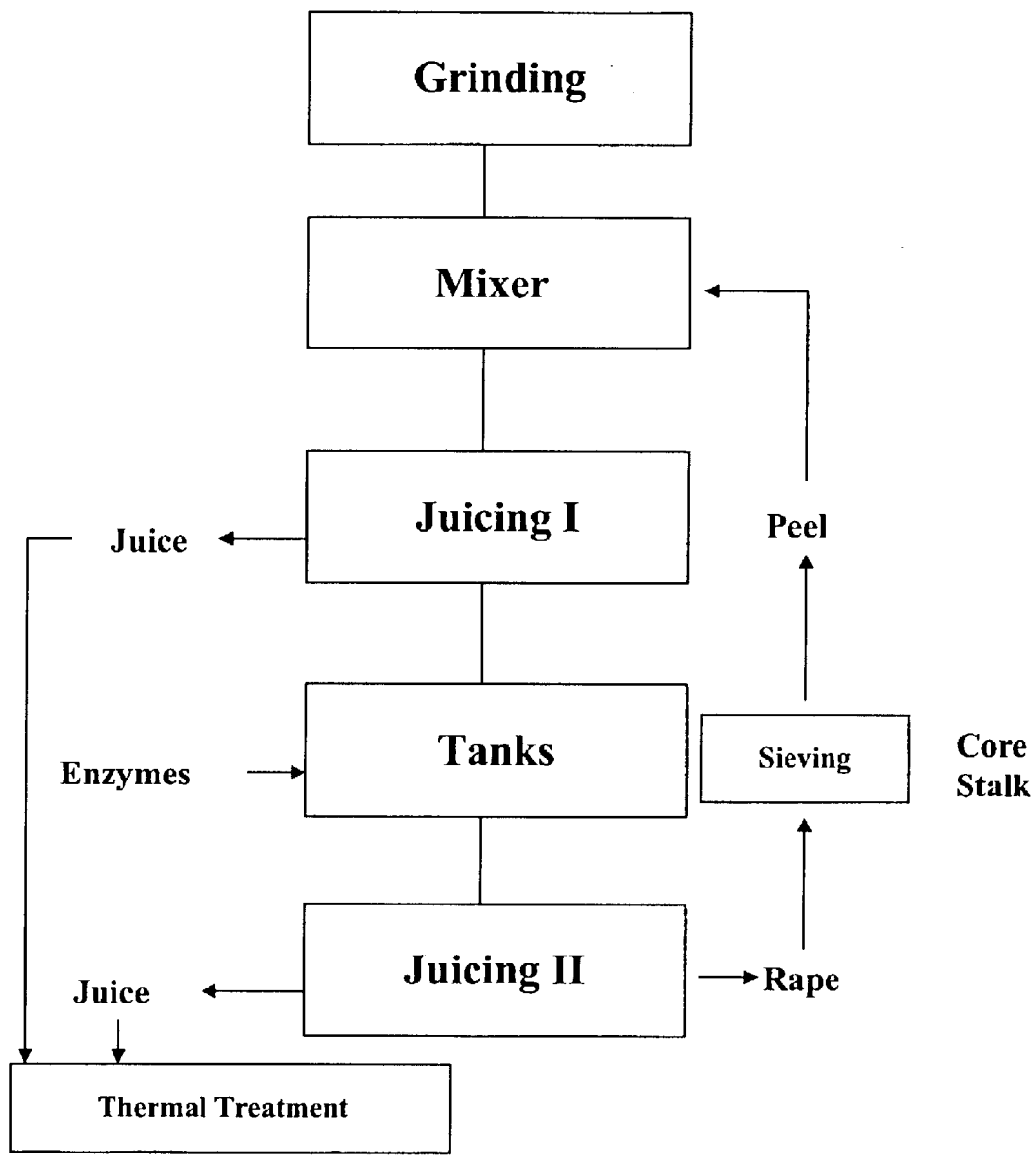
FIG. 5 is a flow chart of a method of producing cloudy juice with a return of peels according to the present invention.

For obtaining a naturally cloudy juice, another embodiment is shown in FIG. 5. In this case, fruit is first reduced or ground 10 to obtain a mash 12 and a first juicing 44 occurs after the mash 12 passes through a mixer 34. A juice 50 from first juicing 44 may be subject to a thermal treatment 42. If desired, the adding of enzymes 28 in tanks 26 may take place after the first juicing 44. That may be followed by a second juicing 48 of the mash 12. Following the second juicing 48, it is possible to subject juice 60 to a thermal treatment 42. The second juicing 48 results in the separation of a juiced rape 38, from which peels or peel components 16 can now also be separated. That can be done, for example, by means of centrifuging (not shown) or sieving 30, and peels 16 are returned preferably alone, or together with other desired components/substances, into the mash 12 to be processed in mixer 34. In the mixer 34, the mixing of the returned peel components 16 and the mash 12 takes place. The separation of peel components 16, may, alternatively, take place after the first juicing step 44.

Although the method described in the preferred embodiment refers to extracting fruit juice, it is equally applicable to the extraction of vegetable juices.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A method for extracting fruit or vegetable juices, the steps comprising:

grinding one of fruits or vegetables to obtain a mash;

adding peel components to the mash; and subsequently juicing the mash.

2. The method according to claim 1, wherein the peel components are obtained from one of fruits or vegetables.

3. The method according to claim 1, wherein one or more of stalk, core and peel components are separated from the mash, whereupon the peel components are further separated from non-peel components and, before juicing, the peel components are returned into the mash.

4. The method according to claim 1, wherein when extracting a naturally cloudy juice, the peel components are separated from a rape separated during the juicing, and the peel components are returned into the mash to be juiced.

5. The method according to claim 1, wherein the peel components are added to the mash after adding enzymes to the mash.

6. The method according to claim 1, wherein the peel components are added to the mash after adding full liquefaction enzymes.

7. The method according to claim 1, wherein at least some peel components are added to the mash such that a resulting fraction of peel components in the mash exceeds a natural peel quantity fraction of the fruit used for extraction.

8. The method according to claim 1, wherein the peel components are separated from other solid components of the mash by one or more of sieving and centrifuging.

9. The method according to claim 1, wherein before being added to the mash, the peel components are subjected to a thermal treatment.

10. The method according to claim 3, wherein the non-peel components are disposed of and/or separately processed.

11. The method according to claim 1, wherein the mash is juiced by a solid-jacket screw-type centrifuge.

12. The method according to claim 2, wherein at least some of the obtained peel components are added to at least one of the mash and other mashes.

13. The method according to claim 1, wherein the peel components are added to the mash before adding enzymes to the mash.

14. The method according to claim 1, wherein the peel components are added to the mash before adding fill liquefaction enzymes to the mash.

15. The method according to claim 4, wherein the rape is obtained from the juicing.

16. The method according to claim 4, wherein the rape is obtained from a second juicing subsequent to the juicing.

* * * * *